(12) United States Patent
Zhao et al.

(10) Patent No.: US 11,501,428 B2
(45) Date of Patent: Nov. 15, 2022

(54) METHOD, APPARATUS AND SYSTEM FOR DETECTING FUNDUS IMAGE BASED ON MACHINE LEARNING

(71) Applicant: Shanghai EagleVision Medical Technology Co., Ltd., Shanghai (CN)

(72) Inventors: Xin Zhao, Beijing (CN); JianHao Xiong, Beijing (CN); ShuLei Li, Beijing (CN); YongPei Ma, Beijing (CN); Chao He, Beijing (CN); Dalei Zhang, Beijing (CN)

(73) Assignee: Shanghai EagleVision Medical Technology Co., Ltd.

( * ) Notice: Subject to any disclaimer, the term of this patent is extended or adjusted under 35 U.S.C. 154(b) by 405 days.

(21) Appl. No.: 16/623,202

(22) PCT Filed: Apr. 25, 2019

(86) PCT No.: PCT/CN2019/084207
§ 371 (c)(1),
(2) Date: Dec. 16, 2019

(87) PCT Pub. No.: WO2019/206208
PCT Pub. Date: Oct. 31, 2019

(65) Prior Publication Data
US 2021/0042912 A1 Feb. 11, 2021

(30) Foreign Application Priority Data

Apr. 26, 2018 (CN) .......................... 201810387302.7

(51) Int. Cl.
*G06T 7/00* (2017.01)

(52) U.S. Cl.
CPC .. *G06T 7/0012* (2013.01); *G06T 2207/20081* (2013.01); *G06T 2207/20084* (2013.01); *G06T 2207/30041* (2013.01)

(58) Field of Classification Search
CPC ......... G06T 7/0012; G06T 2207/20081; G06T 2207/20084; G06T 2207/30041;
(Continued)

(56) References Cited

U.S. PATENT DOCUMENTS

2007/0002275 A1* 1/2007 Yan ........................ G06T 7/0012
351/200
2011/0242306 A1* 10/2011 Bressler ................... A61B 3/12
382/128
(Continued)

FOREIGN PATENT DOCUMENTS

CN          103870838 A  *  6/2014
CN     201410078378.3 A     6/2014
(Continued)

*Primary Examiner* — Van D Huynh
(74) *Attorney, Agent, or Firm* — Timothy T. Wang; Ni, Wang & Massand, PLLC

(57) ABSTRACT

The present invention discloses a method, apparatus and system for detecting a fundus image on the basis of machine learning. The method comprises: acquiring a fundus image to be detected; classifying the entire region of the fundus image by using a first classification model to determine whether the fundus image contains a first feature; and if the fundus image does not contain any first feature, classifying a specific region in the fundus image by using at least one second classification model to determine whether the fundus image contains any second feature, wherein the saliency of the first features are greater than that of the second features.

19 Claims, 4 Drawing Sheets

(58) Field of Classification Search
CPC ........ G06T 2207/10024; G06K 9/6282; G06V 10/454; G06V 10/82; G06V 2201/031
USPC ........................................................ 382/159
See application file for complete search history.

(56) References Cited

U.S. PATENT DOCUMENTS

| | | | |
|---|---|---|---|
| 2013/0116670 A1* | 5/2013 | Artsyukhovich | A61B 3/1233 606/4 |
| 2015/0110348 A1* | 4/2015 | Solanki | G16Z 99/00 382/103 |
| 2016/0166142 A1* | 6/2016 | Kobayashi | A61B 3/14 351/246 |
| 2017/0000342 A1* | 1/2017 | Samec | G16H 40/67 |
| 2018/0070814 A1* | 3/2018 | Mikaelian | A61B 3/024 |
| 2018/0235467 A1* | 8/2018 | Celenk | G06V 40/197 |
| 2020/0234445 A1* | 7/2020 | Lv | G06T 7/0012 |

FOREIGN PATENT DOCUMENTS

| | | | | |
|---|---|---|---|---|
| CN | 106530295 A | * | 3/2017 | ........... G06T 7/0012 |
| CN | 201610978501.6 A | | 3/2017 | |

* cited by examiner

METHOD, APPARATUS AND SYSTEM FOR DETECTING FUNDUS IMAGE BASED ON MACHINE LEARNING

CROSS REFERENCE TO PRIORITY

This application claims priority to Chinese Patent Application No. 201810387302.7, entitled "Method, Apparatus and System for Detecting Fundus Image Based on Machine Learning" filed on Apr. 26, 2018, which is incorporated by reference in its entirety.

FIELD OF THE INVENTION

The present inventions relate to the field of medical image recognition technology, and specifically to a method, apparatus and system for detecting a fundus image based on machine learning.

BACKGROUND OF THE INVENTION

In recent years, machine learning has been widely used in the medical field. Especially, the machine learning technology represented by deep learning has been widely concerned in the medical imaging field. For example, in the aspect of fundus image detection, the deep learning technology can detect a certain feature of a fundus image more accurately. For example, a deep learning model is trained using a large number of samples having a feature of macular holes, and macular hole detection is performed on the fundus image by using the trained model.

These technologies are often limited to the detection of a single feature or a few associated features and cannot accurately detect other features. In contrast, the eye is a very fine and complex organ in the human body and contains a wide variety of often greatly different features. Therefore, macular hole detection results using existing detection technologies are inaccurate. One prior art solution to this problem is to train a model for detecting each feature or features. However, this not only requires a large number of samples, but also sharply increases the amount of calculation in the presence of numerous features, resulting in a decrease in the detection efficiency.

Therefore, there is an urgent need for a technical solution to quickly and accurately detect a fundus image.

SUMMARY OF THE INVENTION

The present inventions relate to the field of medical image recognition technology, and specifically to a method, apparatus and system for detecting a fundus image based on machine learning. In a first aspect, provided is a method for detecting a fundus image based on machine learning, including: acquiring a fundus image to be detected; classifying the entire region of the fundus image by using a first classification model to determine whether the fundus image contains a first feature; and classifying, if the fundus image does not contain any first feature, a specific region in the fundus image by using at least one second classification model to determine whether the fundus image contains any second feature, where the saliency of the first features are greater than that of the second features.

In a second aspect, provided is an apparatus for detecting a fundus image based on machine learning, including: an acquiring module, configured to acquire a fundus image to be detected; a first detecting module, configured to classify the entire region of the fundus image by using a first classification model to determine whether the fundus image contains a first feature; and a second detecting module, configured to classify, when the first detecting module detects that the fundus image does not contain any first feature, a specific region in the fundus image by using at least one second classification model to determine whether the fundus image contains a second feature, where the saliency of the first features are greater than that of the second features.

In a third aspect, provided is an electronic device, including: at least one processor; and a memory connected to the at least one processor by communication; wherein the memory stores instructions executable by the one processor, and the instructions are executed by the at least one processor to cause the at least one processor to implement the method for detecting a fundus image based on machine learning in the first aspect.

In a fourth aspect, provided is a computer storage medium, storing instructions thereon that, when running on a computer, cause the computer to implement the method for detecting a fundus image in the first aspect.

In a fifth aspect, provided is a computer program product including instructions, when running on a computer, causing the computer to implement the method for detecting a fundus image in the first aspect.

In a sixth aspect, provided is a system for detecting a fundus image based on machine learning, including: an image acquiring apparatus, configured to acquire a fundus image; the electronic device in the second aspect, communicating with the image acquiring apparatus to detect the fundus image; and an output apparatus, communicating with the apparatus for detecting a fundus image to output a detection result of the fundus image.

According to the method, apparatus and system for detecting a fundus image based on machine learning provided by the present application, the entire region of the fundus image to be detected is first detected by the first features having high saliency to initially screen the fundus image to be detected, and then the specific region of the image not containing the first features are detected by the second features having low saliency, that is, fundus images having various features are primarily classified, then the images that do not have salient features are finely detected by regions, and the detection results are independently output after step-by-step serial detection, thereby improving the recognition efficiency, and achieving simultaneous and accurate detection of salient features and tiny features.

DETAILED DESCRIPTION OF EMBODIMENTS

In order to describe the technical solutions in the specific embodiments of the present inventions or in the prior art more clearly, the following briefly introduces the accompanying drawings required for describing the specific embodiments or the prior art. The accompanying drawings in the following description show only what can be considered exemplary and preferred embodiments of the present invention, and those of ordinary skilled in the art will readily understand other modifications from the teachings herein.

DETAILED DESCRIPTION

The following clearly and completely describes the technical solutions of the present inventions with reference to the accompanying drawings. The described embodiments are preferred or exemplary embodiments, not all of, the embodiments of the present invention. All other embodiments obtained by a person of ordinary skilled in the art based on the embodiments of the present inventions without creative efforts shall fall within the protection scope of the present disclosure.

In the description of the present inventions, it should be noted that the terms "first", "second", and "third" are only for the sake of description, and cannot be understood as indicating or implying the relative importance. Further, the technical features involved in different embodiments of the present inventions described below may be combined with each other as long as they do not constitute a conflict with each other.

Figure 1:
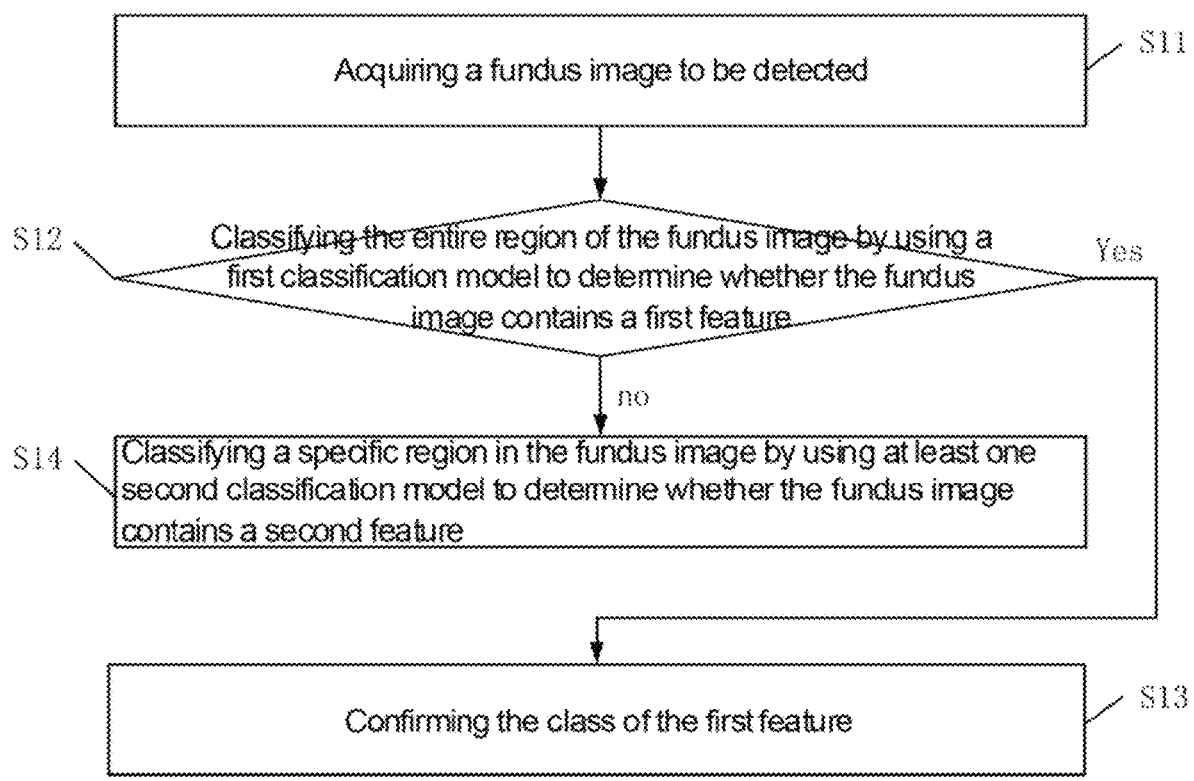
FIG. 1 is a flowchart the method for detecting a fundus image based on machine learning in accordance with one embodiment of the present inventions.

An embodiment of the present inventions provides a method for detecting a fundus image based on machine learning, which can be executed by a computer or a server. As shown in FIG. 1, the method may include the following steps:

S11: acquiring a fundus image to be detected. The image is a fundus retina image shot by an eye detecting device for diagnosing an eye lesion.

S12: classifying the entire region of the fundus image by using a first classification model to determine whether the fundus image contains a first feature. The first features are image features having high saliency. The so-called saliency may be weighed by factors such as chromatic aberration, contrast and gray scale, or the size of the occupied region. For example, if the entire region of the fundus image has a region whose color is greatly different from the normal fundus color, and the ratio of the region is greater than a certain preset value, the region is taken as the first features.

Specifically, the first features may include a large area of abnormal tissue or structure within the fundus, large spots within the fundus, and the like, such as image features related to lesions such as leopard fundus, fundus white spots, and fundus laser spots.

In this solution, the first features is detected using a machine learning algorithm. Before the detection, the classification model should be trained using a large number of fundus image samples having various first features, so that the classification model has certain capabilities of classification. The first classification model may be a single-classification model or a multi-classification model. If it is a single-classification model, the output result is two classes, that is, containing or not containing the first feature; if it is a multi-classification model, the output result is multiple classes, that is the class of not containing any first feature or the class of containing a first feature or features.

If the fundus image contains any first feature, the process proceeds to step S13. If the fundus image does not contain the first feature, the process proceeds to step S4.

S13: confirming the class of the first features as a final detection result. In an embodiment, the multi-classification result is output by a multi-classification model, and the class is determined according to the multi-classification result. For example, the class is of lesions of leopard fundus, fundus white spots, fundus laser spots, etc.

S14: classifying a specific region in the fundus image by using at least one second classification model to determine whether the fundus image contains a second feature. For the case where the second features can be detected, the class of the second features can be further determined as a final detection result. The classification result output by the classification model is generally a numerical value, specifically confidence information or probability expressed by 0-1. In this solution, the value output by the classification model can be used as the final detection result, the value can also be further judged, and a corresponding detection result is determined based on the value.

The second features should be interpreted as detail features, and the saliency of the first features are greater than that of the second feature. For example, the chromatic aberration, contrast, gray scale, or area of the second features are smaller than that of the first features. In fact, since the first classification model carries out global classification for the image, the first classification model and the second classification model both detect the second features, but the first classification model is less sensitive to the second features, while the second classification model is more sensitive to the second features. The second features are in the specific region. The specific region includes at least one of an optic disc region, a macular region, a blood vessel region and a retinal region, and may also be one region or a plurality of regions within a set range. For example, the specific region is an optic disc region, and the second features include a specific feature such as shape abnormality of the optic disc, color abnormality of the optic disc, or abnormality of the optic nerve; alternatively, the specific region is a macular region, and the second features include specific features such as macular structural abnormality, or macular shape abnormality; alternatively, the specific region is a blood vessel region, and the second features include a specific feature such as color abnormality of the blood vessel, trend abnormality of the blood vessel, shape abnormality of the central vein, or shape abnormality of the branch vein; alternatively, the specific region is a retinal region, and the second features includes small abnormal points such as color abnormal points, irregular points, or reduction of the retinal region. In addition, the second features may also include features of other details in the fundus, such as vascular grains.

In this solution, the second features are detected using a machine learning algorithm. Before the detection, the corresponding classification model should be trained using a large number of fundus image samples having various second features, so that the classification model has certain capability of classification.

In an embodiment, a plurality of second classification models are used for parallel classification detection for different specific regions, and each of the second classification models independently outputs a classification result. Specifically, for example, three second classification models are used: the classification model A is used for optic disc region and detects whether the optic disc region contains specific features related to the optic disc, for example, features of various optic disc lesions such as papilledema, papillitis, and optic atrophy; the classification model B is used for macular region and detects whether the macular region contains specific features related to the macula, for example, features of various macular lesions such as macular holes, macular edema, and cartographic atrophy of the macular region; and the classification model C is used for blood vessel region and detects whether the blood vessel region contains specific features related to the blood vessel, for example, features of various blood vessel lesions such as vitreous hemorrhage, choroidal hemangioma, central vein occlusion, and branch vein occlusion.

To reduce the amount of calculations, the second classification models may be configured to output a binary classification result to indicate the presence or absence of the second features of the fundus image. To improve the accuracy of detection, the second classification models may be configured to output a multi-classification result to indicate that the fundus image does not contain any second feature, or the specific class of the contained second feature. In actual application, the output of the multi-classification result or the single-classification result may be determined according to whether the various specific classes obtained by the second classification models conflict.

The entire region of the fundus image to be detected is first detected by the first features having high saliency to initially screen the fundus image to be detected, and then the specific region of the image not containing the first features are detected by the second features having low saliency, that is, fundus images having various features are primarily classified, then the images that do not have salient features are finely detected by regions, and the detection results are independently output after step-by-step serial detection, thereby improving the recognition efficiency, and achieving simultaneous and accurate detection of salient features and tiny features.

Since the fundus photos taken by an image shooter are very different in quality, the photos are often overexposed, gray, and blurry, which greatly increases the difficulty of machine learning judgment. As an alternative embodiment, the quality of images is detected to screen qualified images, which further ensures the accuracy of image detection. In a specific embodiment, the fundus image may be subjected to any one or any combination of stain/bright spot detection, exposure detection, sharpness detection, light leakage detection, and local shadow detection.

Specifically, regarding the stain/bright spot detection, a plurality of images to be detected are weighted and averaged to obtain an average image, and whether the average image has pixels exceeding a preset brightness range is then judged; when the average image has pixels exceeding the preset brightness range, it is confirmed that the image to be detected has stains/bright spots. The detection of stains or bright spots can be completed.

Regarding the light leakage detection, the image to be detected is binarized to obtain a preset region in the image; a mask based on the boundary of the preset region is generated, the mask is fused with the image to be detected; the average color brightness of the image after fusion is calculated and compared with a preset color brightness threshold; and the degree of light leakage of the image to be detected is confirmed according to the comparison result. When the degree of light leakage is greater than a preset value, it can be confirmed that the fundus image has light leakage.

Regarding the local shadow detection, a histogram of any color channel in the image to be detected is counted; the number of pixels smaller than a preset pixel value is counted; whether the number of pixels smaller than the preset pixel value is less than a preset number is judged; and when the number of pixels smaller than the preset pixel value is less than the preset number, it is confirmed that the image to be detected has a local shadow.

Regarding the sharpness detection, a high frequency component of the image to be detected is extracted; an amount of information of the high frequency component is calculated; and the sharpness of the image to be detected is confirmed on the basis of the amount of information of the high frequency component.

Regarding the exposure detection, the image to be detected is converted into a gray image; a root mean square of a histogram of the gray image is counted; and the exposure of the image to be detected is confirmed on the basis of the root mean square.

When the fundus image has the above quality problems, the detection result of the image may be affected, and may be inaccurate. Therefore, in order to ensure the detection accuracy of the image, the image having the above quality defects may be removed before the classification operation.

Figure 2:
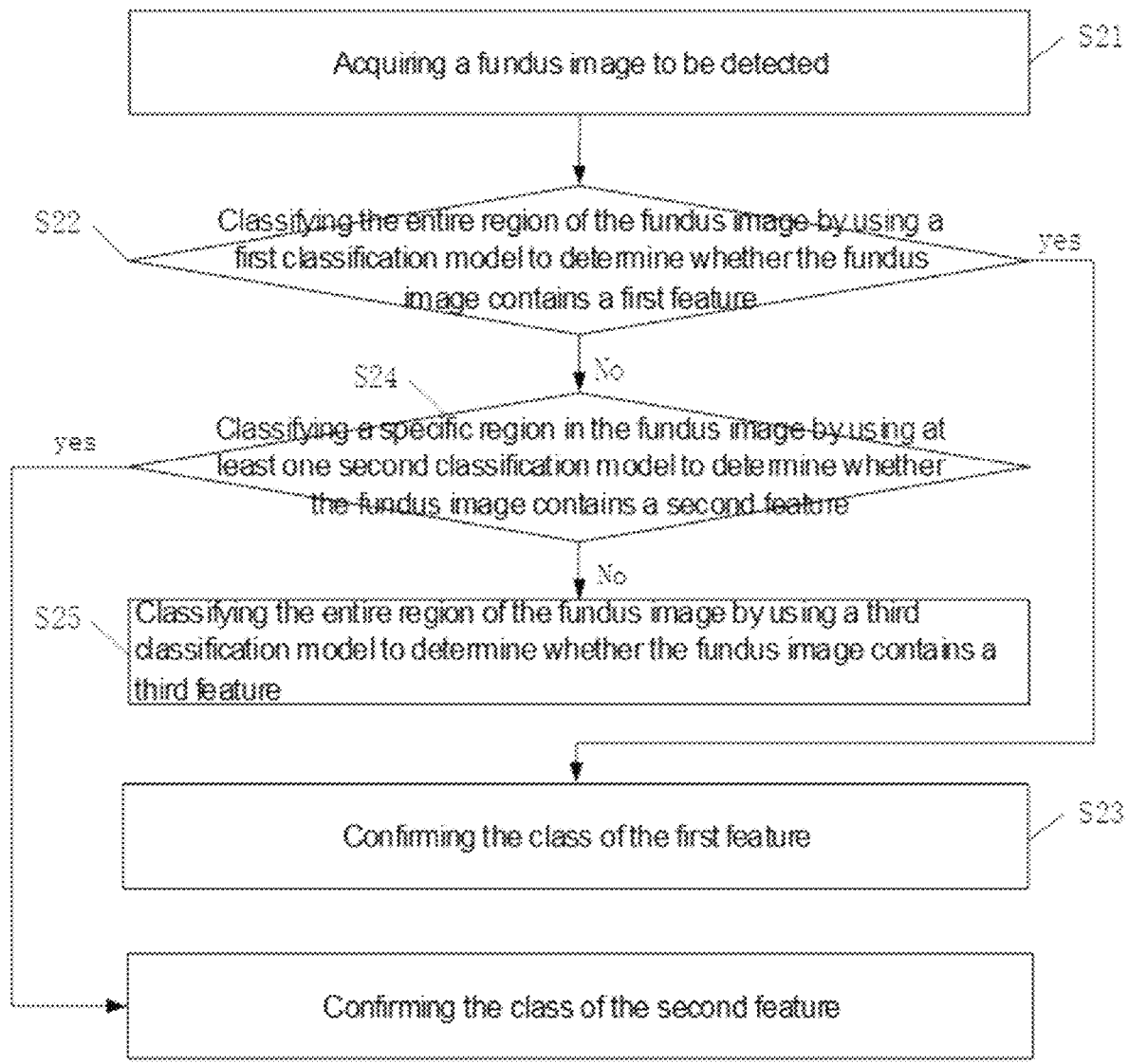
FIG. 2 is a flowchart of another method for detecting a fundus image based on machine learning in accordance with one embodiment of the present inventions.

In practical applications, some features in the fundus image, especially some features having less saliency may not exist in the specific region of the fundus image, and the detection only for the features having less saliency in the specific region may result in missing detection. In order to improve the comprehensiveness and accuracy of the detection, an embodiment of the present inventions further provides a method for detecting a fundus image. As shown in FIG. 2, the method includes the following steps.

S21: acquiring a fundus image to be detected.

S22: classifying the entire region of the fundus image by using a first classification model to determine whether the fundus image contains a first feature. For details, reference may be made to the description of the first features detection in step S12 of the above embodiment. If the fundus image contains any first feature, the process proceeds to step S23; if the fundus image does not contain any first feature, the process proceeds to step S24.

S23: confirming the class of the first feature. For details, reference may be made to the description of confirming the class of the first features in step S13 of the above embodiment.

S24: classifying a specific region in the fundus image by using at least one second classification model to determine whether the fundus image contains a second feature. For details, reference may be made to the description of the second features detection in step S14 of the above embodiment. If the fundus image contains any second feature, a corresponding classification result is output, and similar to step S23, the class of the second features may be further confirmed; if the fundus image does not contain any second feature, the process proceeds to step S25.

S25: classifying the entire region of the fundus image by using a third classification model to determine whether the fundus image contains a third feature. That is, after screening the fundus image by the first features having high saliency and the second features having low saliency in the specific region, if no content is still detected, a global classification is performed to try to find the third features having lower saliency.

The third features are finer features than the second feature, for example, a distributed lesion feature such as a minor lesion of the fundus. After the third features are detected, the detection result is the classification result of the third feature.

To reduce the amount of calculations, the third classification model may be configured to output a binary classification result to indicate the presence or absence of the third features of the fundus image. To improve the accuracy of detection, the third classification model may be configured to output a multi-classification result to indicate that the fundus image does not contain the third feature, or the specific class of the contained third feature.

The step of detecting the third features may also be performed in parallel with the step of detecting the second feature. After the first features detection, the second features detection is performed in the specific regions respectively, and the third features detection is performed in a region beyond the specific region or the entire region of the fundus image, so that the features of the image are accurately detected.

The above various classification models may be implemented by a convolutional neural network. The basic units of the convolutional neural network include convolutional layers, activation function (ReLu) layers, and pooling layers. The convolutional layers screen specific image features, the activation function layers nonlinearly process the screened features by using a ReLu activation function, and the pooling layers extract the strongest information at different locations by means of max pooling. Batch normalization may be used during information extraction to improve the capacity of the network while preventing gradient dispersion in the process of training the network. Through a plurality of such basic units, the features in the fundus image can be extracted and finally output by fully connected layers and an output layer (softmax).

The number of network layers of each module varies from 15 to 100 layers on the basis of the classes of fundus features that need to be detected. Specifically, the convolutional neural network may be implemented as the following structure: input layer-C1-BN1-R1-P1-C2-BN2-R2-P2-C3-BN3-R3-P3-C4-BN4-R4-P4-C5-BN5-R5-P5-FC1-FC2-SoftMax. An image of a certain size is located on the input layer, C represents a convolutional layer (e.g., C1, C2, C3, C4, C5), BN represents a batch normalization layer (e.g., BN1, BN2, BN3, BN4, BN5), R represents a function activation layer (e.g., R1, R2, R3, R4, R5), P represents a pooling layer (e.g., P1, P2, P3, P4, P5), the fully connected layers include FC1 and FC2, and SoftMax provides an output. The convolutional neural network used in the present embodiment is not limited to the structure of the convolutional neural network described above, and other neural network structures satisfying the present embodiment are also applicable.

Since the saliency of the first features are greater than the saliency of the second features and third features set, the sizes of hidden layers of the neural network can be changed according to the saliency of the features, the hidden layers being from the input to the output. Specifically, small hidden layers are used for the features having high saliency, while large hidden layers are used for the features having low saliency. The maximum hidden layer of the convolutional network for the second features and third features set having low saliency are larger than the maximum hidden layer of the convolutional network for the first feature.

Specifically, when the first features are detected, since the feature has high saliency, the maximum hidden layer of the network is required to be small, for example, less than 200×200, facilitating feature extraction. For the second features or third features set having low saliency, the output of the hidden layer with maximum size should be kept large, for example, more than 300×300, ensuring that fine fundus sub-features such as small exudation points and bleeding points can be extracted. The output of the hidden layer with maximum size is determined by the image input layer, the convolutional layers, and the pooling layers together, and is implemented in various ways, and details are not described herein again.

Figure 3:
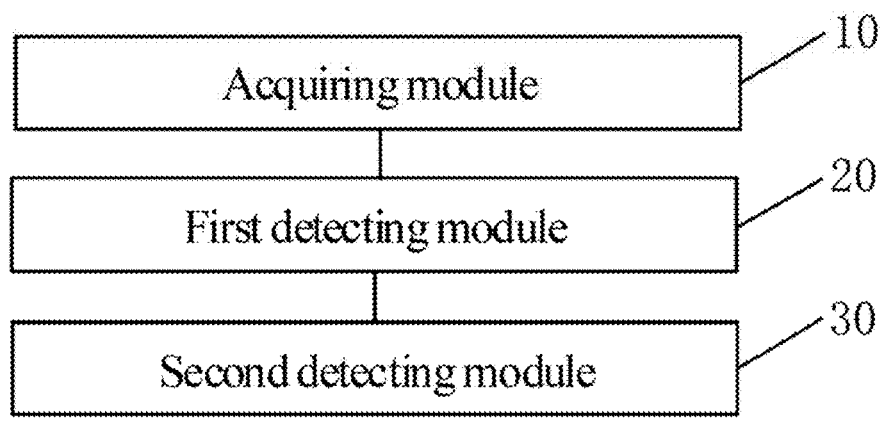
FIG. 3 is a schematic diagram of an apparatus for detecting a fundus image based on machine learning in accordance with one embodiment of the present inventions.

An embodiment of the present inventions provides an apparatus for detecting a fundus image. As shown in FIG. 3, the detecting device includes: an acquiring module 10, configured to acquire a fundus image to be detected; a first detecting module 20, configured to classify the entire region of the fundus image by using a first classification model to determine whether the fundus image contains a first feature; and a second detecting module 30, configured to classify, when the first detecting module detects that the fundus image does not contain any first feature, a specific region in the fundus image by using at least one second classification model to determine whether the fundus image contains any second feature, where the saliency of the first features are greater than that of the second feature.

Figure 4:
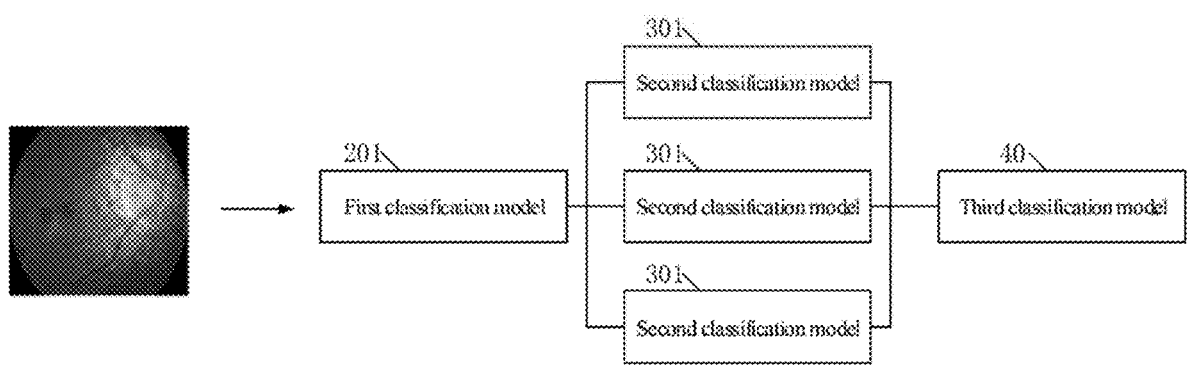
FIG. 4 is a schematic diagram of a preferred apparatus for detecting a fundus image in accordance with one embodiment of the present inventions.

As shown in FIG. 4, as a preferred embodiment, the first detecting module 20 includes a first classification model 201 configured to classify a fundus image and output a first classification result, the first classification result being used to indicate whether the fundus image contains a first feature.

The second detecting module 30 includes at least one second classification model configured to classify a specific region in the fundus image and output a second classification result, the second classification result being used to indicate whether the fundus image contains a second feature.

Further, in the presence of a plurality of specific regions, the second detecting module 30 includes a plurality of second classification models 301 configured to classify different specific regions and output second classification results, the second classification results being used to indicate whether the fundus image contains second features related to the specific regions.

As an alternative embodiment, the specific region includes at least one of an optic disc region, a macular region, a blood vessel region and a retinal region.

As an alternative embodiment, the first classification model and the second classification model are both multi-classification models, and the classification results thereof are used to indicate whether the fundus image contains the first features and the second feature, and the specific classes of the first features and the second features.

As an alternative embodiment, the apparatus for detecting a fundus image further includes: a quality detecting module, configured to detect the quality of fundus images to screen the fundus images. Specifically, the fundus image is subjected to any one or any combination of stain/bright spot detection, exposure detection, sharpness detection, light leakage detection, and local shadow detection.

As an alternative embodiment, the apparatus for detecting a fundus image further includes: a third classification model 40 configured to classify, when the fundus image does not contain any second feature, the entire region of the fundus image to determine whether the fundus image contains a third feature, the saliency of the third features being smaller than that of the second feature.

As an alternative embodiment, the third classification model is a multi-classification model, and the classification result thereof is used to indicate whether the fundus image contains a third feature, and the specific class of the third feature.

As an alternative embodiment, the first feature, the second feature, and the third features detected by the apparatus are all fundus lesion features.

Figure 5:
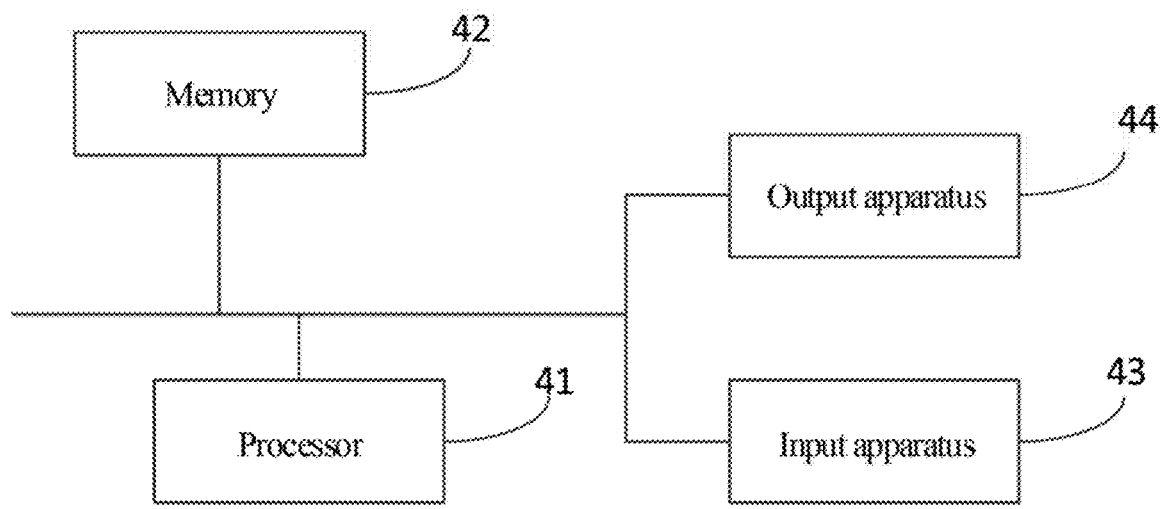
FIG. 5 is a schematic diagram of an electronic device for executing the method for detecting a fundus image in accordance with one embodiment of the present inventions.

An electronic device may be a server or a terminal. As shown in FIG. 5, a controller is included, the controller includes one or more processors 41 and a memory 42, and one processor 43 is taken as an example in FIG. 5. The electronic device may further include an input apparatus 43 and an output apparatus 44. The processor 41, the memory 42, the input apparatus 43, and the output apparatus 44 may be connected by a bus or other means, exemplified by a bus in FIG. 4. The processor 41 may be a Central Processing Unit (CPU). The processor 41 may be other general-purpose processor, a Digital Signal Processor (DSP), an Application Specific Integrated Circuit (ASIC), a Field-Programmable Gate Array (FPGA) or other programmable logic device, a discrete gate or transistor logic device, a discrete hardware component or other chips, or a combination of the various chips. The general-purpose processor may be a microprocessor or any conventional processor, etc.

As a non-transitory computer readable storage medium, the memory 42 can be used for storing non-transitory software programs, non-transitory computer executable programs, and modules. The processor 41 runs the non-transitory software programs, instructions and modules stored in the memory 42 to execute various function applications of the server and data processing, that is, to implement the method for detecting a fundus image in the above method embodiments. The memory 42 may include a program storage region and a data storage region. The program storage region may store an operating system, and an application program required by at least one function. The data storage region may store data created according to the use of processing apparatuses for the server. In addition, the memory 42 may include a high-speed random-access memory, and may also include a non-transitory memory, for example, at least one magnetic disk storage device, a flash memory, or other non-transitory solid-state storage device. In some embodiments, the memory 42 may alternatively include memories remotely disposed relative to the processor 41, and these remote memories may be connected to a network connecting apparatus through a network. Examples of the network include, but are not limited to, the Internet, an intranet, a local area network, a mobile communications network, or a combination thereof.

The input apparatus 43 may receive input digit or character information, and generate a key signal input related to the user setting and function control of the processing apparatuses of the server. The output apparatus 44 may include a display device such as a display screen.

One or more modules are stored in the memory 42, and when executed by one or more processors 41, implement the method as shown in FIG. 1 or 2.

Figure 6:
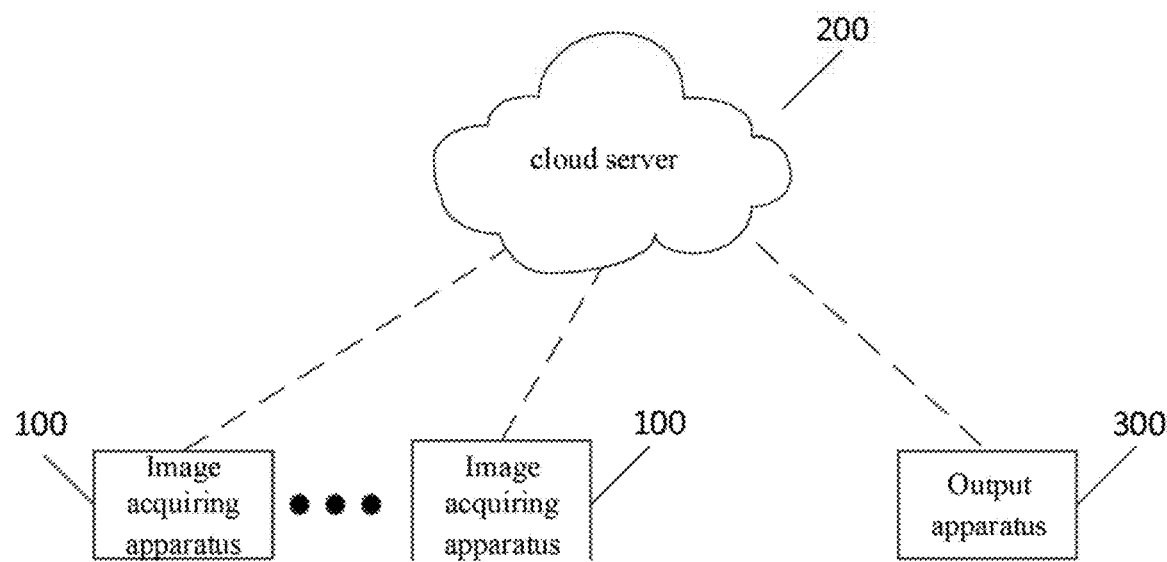
FIG. 6 is a schematic diagram of a system for detecting a fundus image based on machine learning in accordance with one embodiment of the present inventions.

An embodiment of the present inventions further provides a system for detecting a fundus image based on machine learning. As shown in FIG. 6, the system includes: an image acquiring apparatus 100, configured to acquire a fundus image. In the present embodiment, the image acquiring apparatus may be plural. Specifically, for example, the image acquiring apparatus 100 is a fundus shooting device in each hospital, or a fundus shooting device of an individual user. In the present embodiment, the fundus detecting system further includes a cloud server 200. An apparatus for detecting a fundus image for executing the method for detecting a fundus image is provided in the cloud server 200. The cloud server 200 communicates with the image acquiring apparatus 100, for example, in the form of wireless communication, or wired communication. The fundus image acquired by the image acquiring apparatus 100 is uploaded to the cloud server 200, an electronic device executes the method for detecting a fundus image to obtain a detection result, and an output apparatus outputs the detection result. Specifically, the output apparatus 300 may be a display device, or a printing device for printing in the form of a report, or a user terminal device, such as a mobile phone, tablet or personal computer.

A person skilled in the art should understand that the embodiments of the present inventions may be provided as a method, a system, or a computer program product. Therefore, the present inventions may be in the form of a full hardware embodiment, a full software embodiment, or an embodiment combining software and hardware. In addition, the present inventions may be in the form of a computer program product implemented on one or more computer available storage media (including but not limited to a disk memory, a CD-ROM, an optical memory, and the like) including computer available program codes.

The present inventions are described with reference to flow diagrams and/or block diagrams of the method, equipment (system), and the computer program product in the embodiments of the present inventions. It should be understood that computer program instructions can implement each process and/or block in the flow diagrams and/or block diagrams and a combination of processes and/or blocks in the flow diagrams and/or block diagrams. These computer program instructions may be provided to a general-purpose computer, a dedicated computer, an embedded processor, or a processor of other programmable data processing equipment to generate a machine, so that a device configured to implement functions specified in one or more processes in the flow diagrams and/or one or more blocks in the block diagrams is generated by using instructions executed by the computer or the processor of other programmable data processing equipment.

These computer program instructions may also be stored in a computer readable memory that can guide a computer or other programmable data processing equipment to work in a specific manner, so that the instructions stored in the computer readable memory generate a product including an instruction device, where the instruction device implements functions specified in one or more processes in the flow diagrams and/or one or more blocks in the block diagrams.

These computer program instructions may also be loaded into a computer or other programmable data processing equipment, so that a series of operation steps are performed on the computer or other programmable data processing equipment to generate processing implemented by a computer, and instructions executed on the computer or other programmable data processing equipment provides steps for implementing functions specified in one or more processes in the flow diagrams and/or one or more blocks in the block diagrams.

It is apparent that the above embodiments are merely illustrative of the examples and are not intended to limit the embodiments. Other variations or modifications of different forms may be made by those of ordinary skilled in the art in light of the above description. There is no need and no way to exhaust all of the embodiments. Obvious variations or modifications resulting therefrom are still within the scope of the present invention.

The invention claimed is:

1. A method for detecting a fundus image based on machine learning, comprising:
   acquiring a fundus image to be detected;
   classifying an entire region of the fundus image b using a first classification model to determine whether the fundus image contains a first feature or features; and classifying, if the fundus image does not contain any first feature, a specific region in the fundus image by using at least one second classification model to determine whether the fundus image contains a second feature or features, and a saliency of the first feature or features are greater than that of the second feature or features.

2. The method according to claim 1, wherein the specific region and the second classification model are respectively plural, and in the step of classifying a specific region in the fundus image by using at least one second classification model, different second classification models are respectively used to classify different specific regions and output second classification results, the second classification results being used to indicate whether the fundus image contains second features related to the specific regions.

3. The method according to claim 1 or 2, wherein the first classification model and the second classification model are both multi-classification models, and the classification results thereof are used to indicate whether the fundus image contain the first features and the second features, and the specific classes of the first features and the second features.

4. The method according to claim 1, wherein the specific region comprises at least one of an optic disc region, a macular region, a blood vessel region and a retinal region.

5. The method according to claim 1, wherein the first features and the second feat features are both fundus lesion features.

6. The method according to claim 1, wherein if the fundus image does not contain any second feature, after classifying a specific region in the fundus image by using at least one second classification model, the method further comprises:
classifying the entire region of the fundus image by using, a third classification model to determine whether the fundus image contains arty third feature, wherein the saliency of the third features are smaller than that of the second features.

7. The method according to claim 6, wherein the third features are fundus lesion features.

8. The method according to claim 6, wherein the third classification model is a multi-classification model, and the classification result thereof is used to indicate whether the fundus image contains a third feature, and the specific class of the third feature.

9. An electronic device, comprising at least one processor; and a memory connected to the at least one processor by communication; wherein the memory stores instructions executable by the one processor, and the instructions are executed by the at least one processor to cause the at least one processor to implement the following operation:
acquiring a fundus image to be detected; classifying an entire region of the fundus image by using a first classification model to determine whether the fundus image contains a first feature; and if the fundus image does not contain the first feature, classifying a specific region in the fundus image by using at least one second classification model to determine whether the fundus image contains a second feature, wherein the saliency of the first feature is greater than those of the second feature.

10. The device according to claim 9, wherein the specific region and the second classification model are respectively plural, and the processor is configured to: classify, in the step of classifying a specific region in the fundus image by using at least one second classification model, different specific regions and output second classification results by using different second classification models respectively, the second classification results being used to indicate whether the fundus image contains second features related to the specific regions.

11. The device according to claim 9 or 10, wherein the first classification model and the second classification model are both multi-classification models, and the classification results thereof are used to indicate whether the fundus image contains the first features and the second features, and the specific classes of the first features and the second feature.

12. The device according to claim 9, wherein the specific region comprises at least one of an optic disc region, a macular region, a blood vessel region and a retinal region.

13. The device according to claim 9, wherein the first features and the second features are both fundus lesion features.

14. The device according to claim 9, wherein the processor is configured to: classify, if the fundus image does not contain any second feature, the entire region of the fundus image by using a third classification model to determine whether the fundus image contains any third feature, after classifying a specific region in the fundus image by using at least one second classification model, wherein the saliency of the third features are smaller than that of the second features.

15. The device according to claim 14, wherein the third features are fundus lesion features.

16. The device according to claim 14, wherein the third classification model is a multi-classification model, and the classification result thereof is used to indicate whether the fundus image contains any third feature, and the specific class of any third feature.

17. A non-transitory computer storage medium, storing instructions thereon that, where running on a computer, cause the computer to implement the method for detecting a fundus image according to claim 1.

18. A computer program product comprising instructions, when running on a computer, causing, the computer to implement the method for detecting a fundus image according to claim 1.

19. A system for detecting a fundus image based on machine learning, comprising:
an image acquiring apparatus, configured to acquire a fundus image;
the device according to claim 9, communicating with the image acquiring apparatus to detect the fundus image; and
an output apparatus, communicating with an apparatus for detecting a fundus image to output a detection result of the fundus image.

* * * * *